June 11, 1968   R. F. DE MARCO   3,387,735
METAL INSERT FOR WALL OPENINGS AND METHOD OF
COMBINING THE SAME THEREWITH
Filed Aug. 31, 1966

INVENTOR.
ROBERT F. DE MARCO
BY
John H Leonard,
his ATTORNEY.

United States Patent Office 3,387,735
Patented June 11, 1968

3,387,735
METAL INSERT FOR WALL OPENINGS AND METHOD OF COMBINING THE SAME THEREWITH
Robert F. De Marco, Mentor, Ohio, assignor to Fluid Controls, Inc., Mentor, Ohio, a corporation of Ohio
Filed Aug. 31, 1966, Ser. No. 576,260
10 Claims. (Cl. 220—24)

This invention relates to an insert adapted to be secured in tight fitting relation in an opening in a metal body, and to a method of producing a combination of a metal body and insert, and particularly to a metal insert arranged to broach the wall of an opening into which it is inserted to proper size for effecting a precise and tight fit with an outer peripherally continuous wall of the insert.

For the purposes of illustration, the invention is disclosed herein in its primary form as a mere sealing plug and in another form as an internally threaded annulus adapted for screw threaded attachment to externally threaded fittings, such as faucets, spigots, valves, pipes, and the like. The insert is shown in its preferred shape which is circular in section in planes normal to its lengthwise axis, its application to inserts in which the sections in such planes are non-circular being readily apparent from the illustrative example.

Heretofore plugs and other inserts have been provided for installation in openings in metal plates, such as the sides and ends of metal barrels, boilers, and other plates, and the like. A large number of these require access to the insert being installed at both of the opposite faces of the plate, a condition which is not objectionable in those instances in which both faces of the plate are exposed. However, quite often in the fabrication of metal containers and the like, it is necessary to leave a hole for clean out or for attachment of the external fittings. Frequently these openings must be of different sizes and provided with different types of threads, depending upon customer demands. These demands pose problems in manufacture. For efficiency in production, it is desirable, if possible, to make all openings of the same size, and then to install inserts after the container is otherwise completely fabricated, wherefore access is afforded only to the exterior of the metal plate to which the insert is to be connected.

It is not uncommon in prior inserts to provide in the insert a peripheral groove which is adapted to be exposed within the opening, and also to provide means on the insert which, during installation, cause a cold flow of material of the plate into the groove so that the cold flowed material in the groove interlocks the insert and plate. This cold flow is effected generally by a swaging action of metal surrounding the opening and extending a substantial extent radially outwardly from the opening. Sometimes combined cutting and swaging is used, the cutting being to assist in the swaging action and cold flow of the material into the interlocking relation in the groove. In such structures, the cold flowed metal remains attached to the plate and is basically the connecting means between the insert and plate.

In accordance with the present invention, inserts are provided in the form of solid closure plugs or annular internally threaded inserts for connection to threaded fittings. These inserts are formed with a peripherally continuous broach portion so arranged that the insert can be readily pressed into the opening in the container wall after the container is completed. During insertion, the insert broaches the wall of the opening to precise shape and size for tightly fitting a peripheral wall portion of the insert. Thus, a large number of standard containers can be manufactured with an opening of adequate size for clean-out and the like, and after the container or barrel is otherwise completed, the opening can be plugged or provided with an internally threaded insert with threads which meet the particular customer's requirements. Accordingly, instead of maintaining a large inventory of barrels or containers with special threads to meet customer requirements, it is only necessary to maintain on hand a limited inventory of barrels and an inventory of specialized inserts.

Various objects and advantages of the present invention will become apparent from the illustrative example wherein reference is made to the drawings, in which.

Figure 1:
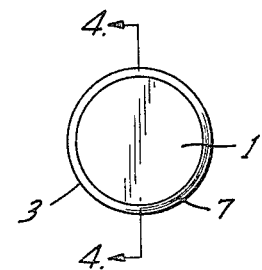
FIG. 1 is a front plan view of an insert embodying the principles of the present invention.
Figure 2:
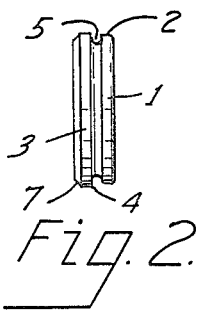
FIG. 2 is a right side elevation of the structure illustrated in FIG. 1.
Figure 3:
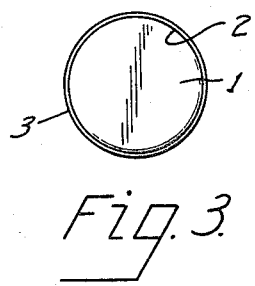
FIG. 3 is a rear elevation of the insert illustrated in FIGS. 1 and 2.
Figure 4:
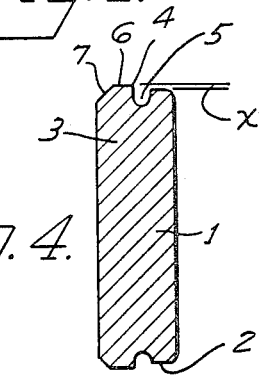
FIG. 4 is an enlarged cross-sectional view of the insert illustrated in FIG. 1 and is taken on line 4—4 thereof.
Figure 8:
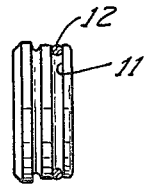
FIG. 8 is a view, similar to FIG. 2, showing an insert with an O-ring seal.

Referring first to FIGS. 1 through 4, the insert is shown as a solid metal body 1 which is circular in section in all planes normal to its endwise axis. The body 1 is provided with a guide portion 2 of which the outer end preferably is at one end of the body 1 and of which the inner end is spaced from both ends of the body 1. The body 1 also has a broach portion 3 which preferably is spaced endwise of the body in a direction toward the opposite end from the guide portion 2. The broach portion 3 has at its outer periphery a cutting edge 4 which faces endwise toward the guide portion 2, the cutting edge being of a very slightly greater radius than the radius of the guide portion 2, as indicated at x in FIG. 4; for example, ¹⁄₆₄ to ¹⁄₃₂ of an inch greater in radius than the maximum radius of the guide portion 2. Between the portions 2 and 3 and preferably adjacent to the cutting edge 4, the body is provided with a radially outwardly open peripheral groove 5 which is arranged to receive and hold chips cut or broached off by the edge 4 from the wall of the opening into which the insert is installed by pressing it axially, guide end 2 foremost, into an opening of the properly related size. The cutting edge 4 of the broach portion 3 is not one which is adapted for distorting the metal to cause cold flow thereof into the groove 5, but, on the contrary, is one which effects enlargement and truing up of the opening and smoothing of its newly broached wall to the precise shape and size required for the insert by cutting a very thin stratum of the metal of the plate defining the opening in the form of loose and frangible chips or shavings which break away readily from the plate and pack in the groove 5. These chips do not form the binding connection between the insert and walls of the opening in which the insert is installed.

Beyond the cutting edge 4 in a direction away from the guide portion 2, the broach portion has a peripheral wall 6 of substantial length axially of the insert. The wall 6 is essentially the same diameter or outline in a plane normal to the axis as the cutting edge 4. However, if desired, it may be very slightly greater in diameter or outline than the edge 4 so that as the insert is pressed into the opening, guide portion 2 foremost, the cutting edge 4 broaches the opening wall to provide an opening into which the peripheral wall 6 is press fitted. Thus, the guiding, the broaching of the opening to desired size, the accumulation and storage of chips, and tight fitting of the surface 6 against the newly exposed wall defining the opening are effected as the insert is pressed into place. If desired, the insert may be provided at the end opposite the guide portion with a retaining shoulder 7 which, in the form illustrated, is provided by beveling the end of the insert at the juncture of the wall 6 and the adjacent end of the insert. This shoulder 7 thus faces generally away from the end of the insert at which the guiding portion 2 is provided. After the insert is inserted in its newly broached opening, the metal of the plate in which the opening is arranged can be peened over against the shoulder 7 for constraining the insert from movement out of the opening in the direction outwardly of the container. If desired, the insert may be welded or otherwise bonded in place.

The guide portion 2, in the form illustrated, is preferably cylindrical with a continuous peripheral wall. However, since it is only for guiding purposes its peripheral wall need fit the wall of the opening only at a plurality of space points for purposes of guiding the plug into the opening in coaxial relation; for example, a minimum of three properly spaced points of contact would be adequate for this purpose. These points, however, should lie on a circle of slightly less diameter than the opening. In those instances in which the opening in the metal plate is other than circular, the insert may be of a corresponding shape.

Thus the guide portion 2 may be of the same shape as the opening or of a different shape if fitting therein sufficiently to effect guiding. The cutting edge 4 is of the same shape as the opening but very slightly larger so as to broach the walls thereof as it is forced into the opening. The wall 6 is of a size to fit tightly against the newly broached wall. The body 1 and its cutting edge 4 are made of metal of sufficient hardness for broaching the particular plate material to which the insert is to be connected.

For example, for steels commonly used for steel barrels and the like, the insert may be of steel which is heat treated or hardened much as in the case of a conventional broach or reamer used with steel. On the other hand, with softer metals, such as aluminum, an ordinary soft steel, or soft steel with a minute amount of lead incorporated, may be used. It is noted that for such use with steel the cutting edge is made with the usual sharpness, but, for aluminum, a very slight radius or rounding of the cutting edge 4 is preferred; such, for example, as from 0.001 to 0.005 inch radius.

The hardness of the insert is selected according to use, having in mind that since it is to perform a broaching operation only once, the cutting edge need not be treated for wear and heat resistance.

Figure 5:
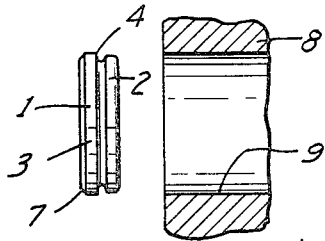
FIG. 5 is a right side elevation of the insert and a fragment of a metal plate having an opening in which the insert is to be installed, showing the alignment of the insert and opening preparatory to installation of the insert.
Figure 6:
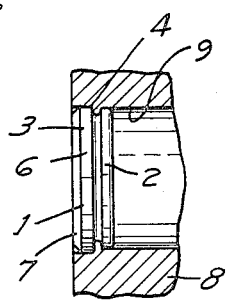
FIG. 6 is a view similar to FIG. 5 but showing the insert pressed into final position in the opening.
Figure 7:
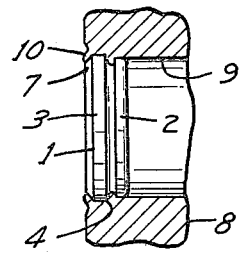
FIG. 7 is a view similar to FIG. 6 showing the peening over of the metal of the plate for securing the insert against removal outwardly from the opening.
Figure 9:
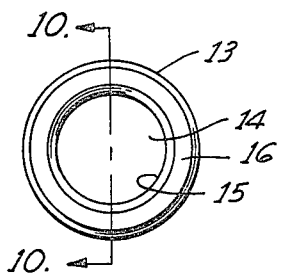
FIG. 9 is a view, similar to FIG. 1, showing an insert embodying the present invention and having a threaded axial passage therethrough.

In FIGS. 5 through 7 there are shown the steps of installing an insert as the body 1 or the internally threaded annulus as illustrated in FIG. 9, in an opening in a plate 8 which may be a wall of a container. The plate 8 has an opening 9 which is of the same shape and size throughout its length and extends entirely through, or to the desired depth, in the plate 8. Its outline is very slightly smaller than the outline of the wall 6. The insert is aligned with the opening 9, as in FIG. 5, and is moved to dispose the guide portion 2 in guiding relation in the opening 9. In this position pressure is applied endwise of the insert and it is pressed into the opening 9 to the desired distance, preferably such that the surface 6 has a substantial bearing against the newly broached wall of the opening as broached by the cutting edge 4. As the insert is pressed into position, the edge 4 broaches the surface defining the opening to the proper size and shape and the chips are broken loose and accumulate in the groove 5. If the wall 6 is of the same diameter as the broaching edge, a tight press fit results between it and the newly formed wall of the opening 9. This is because of the elastic deformation of the metal being broached, which permits the wall of the opening to return slightly to a smaller diameter than the diameter of the broach.

On the other hand, if an extremely tight fit is required, wall 6 can be made very slightly greater in diameter than the broaching edge so that not only does the tendency of return of the metal of the plate from elastic deformation by the cutting edge of the broach, but also the positive elastic deformation by the wall 6 of the broach combine to increase the pressure of the press fit.

After the body 1 is pressed into place, usually to a depth such that its outer end is flush with the outer surface of the plate 8, the metal of the plate is peened over, as indicated at 10, against the shoulder 7 so as to constrain the insert from outward movement. If desired, the insert can be soldered, welded, or otherwise bonded in place.

Generally, this installation of the insert results in a fluid tight seal between the wall of the opening 9 and the peripheral wall 6 of the insert. However, if extremely high pressure is to be withstood and an additional seal is desired, the guide portion 2 may be provided with a groove 11 and an O-ring seal 12 may be installed in that groove, the O-ring accommodating itself to the original walls of the opening effecting a seal therewith.

Figure 10:
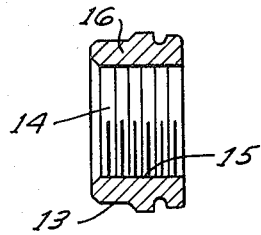
FIG. 10 is a cross-sectional view taken on the line 10—10 of FIG. 9.

As mentioned, it is often desirable that the insert be internally threaded for the purposes of receiving an externally threaded fixture. For this purpose, the form illustrated in FIGS. 9 and 10 is provided. In this form the insert is in the form of a body 13 having an annular passage 14 therethrough and being internally threaded as indicated at 15. The body may be, in other respects, the same as the body 1 heretofore described. Preferably, however, it has an axially extended outer portion 16 which is disposed outwardly from the outer surface of the metal plate or wall in which the insert is installed. This is for the purpose of obtaining a greater thread length and bearing surface for the fixture connected thereto. This extension is made because the present insert is sufficiently effective so that it is of adequate length for being securely anchored in the opening even when of an axial length much too short to permit an adequate thread length for attaching fittings. The insert may or may not, as desired, extend entirely through the metal plate 8. It does not need to be accessible from both sides of the plate for connection.

Since with the present insert, a container can be completed without the necessity for internally threaded holes, the wall thickness around the holes need not be artificially increased by fittings and the like during fabrication of the basic container. In this respect it is to be noted that a tapped hole must be tapped deeper than a portion of the fixture to be inserted therein. The tap must have a lead, usually a guide, and the tap drill must be deeper than the deepest tap thread. Eliminating this requirement with the present type of tapped insert permits the insert to be much shorter axially than conventional types.

In accordance with the present invention, the insert, when used with steel and hard metals, preferably should be heat treated so as to provide a hardened cutting edge. However, since this edge is to be used only once it does not have to be heat treated to the same extent as a conventional broach.

Having thus described my invention, I claim:

1. An insert adapted to be secured in tight fitting relation in an opening in a metal wall and comprising a rigid body having a guide portion and a broach portion spaced endwise of the body from the guide portion, the broach portion having an annular cutting edge which is continuous peripherally and faces endwise of the body toward the guide portion, the peripheral outlines of the cutting edge and of the guide portion, respectively, when projected on a plane normal to the axis of the cutting edge, being so related that the outline of the guide portion is disposed wholly within and spaced inwardly from the outline of the cutting edge, the spacing of the cutting edge outwardly from the guide portion being relatively small so that the cutting edge can broach off and convert to chips a radially thin stratum of the metal defining the original wall opening into which the guide portion can fit in guiding relation, and thereby broach the opening to a precise shape and size, and said body having a peripherally continuous groove adjacent the cutting edge and opening radially outwardly and operative to receive and accommodate the chips formed by the cutting edge as they are cut loose from the wall of the opening by pressing the body, guide portion foremost, into the wall opening.

2. The structure according to claim 1 wherein the broach portion has a peripheral wall extending from the cutting edge in a direction away from the guide portion for a substantial distance endwise of the body, and said peripheral wall being of substantially uniform cross-section throughout its length endwise of the body and of substantially the same cross-section as the outer periphery of the cutting edge and at least as large in outline as said cutting edge.

3. The structure according to claim 2 wherein said peripheral wall is slightly larger than said cutting edge.

4. The structure according to claim 1 wherein the cutting edge is circular, the outer peripheral wall of the broach portion is cylindrical and coaxial with the cutting edge and is at least as large in diameter as the cutting edge, the cutting edge is of slightly larger diameter than the maximum diameter of the guide portion, the said groove is circular in section in planes normal to the axis of the body, and is of less diameter than the cutting edge and has an inner diameter less than the outer diameter of the guide portion.

5. The structure according to claim 1 wherein the body has a retaining shoulder facing endwise of the body in a direction from the cutting edge and guide portion.

6. The structure according to claim 1 wherein the body has an internally threaded axial passage extending entirely therethrough endwise of the body.

7. The structure according to claim 1 wherein the body has a solid imperforate plug.

8. The structure according to claim 1 wherein the guide portion extends from one end of the body to the adjacent edge of the chip receiving groove, the cutting edge is disposed at the opposite edge, endwise of the body, of the groove, and the retaining shoulder is at the opposite end of the body.

9. The structure according to claim 1 wherein the body has an outwardly open groove in addition to the chip receiving groove, and located between, and in spaced relation to, the cutting edge and the end of the body toward which the cutting edge faces, and an O-ring is accommodated at the end of said groove.

10. The process for producing a combination of a metal plate having an opening therein and providing an insert to be secured in the opening, and comprising forming a body having a guide portion receivable in and fitting in guiding relation in, the opening, and said insert having a cutting edge facing towards said guide portion and of a shape corresponding to the shape of the opening and very slightly larger in outline than said opening, and having a peripheral wall extending from the cutting edge in a direction away from the guide portion for a substantial distance and coextensive peripherally with, and, of substantially the same shape as, and at least as large in outline as, the cutting edge;

pressing the insert, guide portion foremost, into the opening and thereby broaching off and forming into chips a thin stratum of the metal defining the original opening and thereby concurrently broaching an enlarged opening very slightly larger than the old opening, removing the chips so formed from the newly formed wall surface defining the enlarged opening and concurrently press-fitting the peripheral wall of the body into binding contact with the wall of the enlarged opening, and then securing the plate and insert together so as to constrain the insert from moving outwardly out of the opening.

References Cited
UNITED STATES PATENTS 1,905,653  4/1933  Schranz.
2,789,721  4/1957  Schoessow.

THERON E. CONDON, *Primary Examiner.*

J. B. MARBERT, *Assistant Examiner.*

Notice of Adverse Decision in Interference

In Interference No. 96,679 involving Patent No. 3,387,735, R. F. De Marco, METAL INSERT FOR WALL OPENINGS AND METHODS OF COMBINING THE SAME THEREWITH, final judgment adverse to the patentee was rendered Jan. 25, 1971, as to claims 1, 2, 4, 7 and 10.
[*Official Gazettee March 9, 1971.*]